United States Patent [19]

Berne et al.

[11] Patent Number: 4,659,903
[45] Date of Patent: Apr. 21, 1987

[54] PROCESS AND MACHINES FOR AUTOMATICALLY WELDING OR CUTTING THE JUNCTION POINT BETWEEN A MAIN PIPE AND A SECONDARY BRANCH PIPE

[75] Inventors: Jean Berne, Aix-en-Provence; Georges Livet, Martigues, both of France

[73] Assignee: Societe Nouvelle des Ateliers et Chantiers du Havre, Le Havre, France

[21] Appl. No.: 625,451

[22] Filed: Jun. 28, 1984

[30] Foreign Application Priority Data

Jul. 22, 1983 [FR] France ............................ 83 12307

[51] Int. Cl.⁴ ............................................ B23K 9/12
[52] U.S. Cl. .............................. 219/125.11; 219/60 R; 219/61; 228/7
[58] Field of Search ............... 219/125.1, 125.11, 59.1, 219/60 R, 61; 266/57, 59, 61, 62; 228/7

[56] References Cited

U.S. PATENT DOCUMENTS

| | | | |
|---|---|---|---|
| 3,243,094 | 3/1966 | Lucas, Jr. .......................... | 219/125.1 |
| 3,897,898 | 8/1975 | Hirose et al. ...................... | 219/125.1 |
| 4,014,495 | 3/1977 | Oda et al. .......................... | 219/125.1 |
| 4,233,491 | 11/1980 | Maruyama et al. ................ | 219/125.1 |
| 4,264,058 | 4/1981 | Wear et al. ........................ | 266/57 |

FOREIGN PATENT DOCUMENTS

| | | |
|---|---|---|
| 2713541 | 10/1978 | Fed. Rep. of Germany . |
| 3005153 | 3/1981 | Fed. Rep. of Germany . |
| 55-45563 | 3/1980 | Japan ............................... 219/125.1 |

Primary Examiner—Clifford C. Shaw
Attorney, Agent, or Firm—Balogh, Osann, Kramer, Dvorak, Genova & Traub

[57] ABSTRACT

The invention relates to a machine for automatically welding and/or cutting the junction point between a main pipe and a secondary branch pipe placed thereon. This machine comprises a positioning support on which the main pipe is placed. The positioning support comprises two servomotors which drive the main pipe in rotation about the longitudinal axis of the pipe and about a second horizontal axis perpendicular to said longitudinal axis. The machine comprises a travelling gantry crane which bears three carriages movable by three servomotors along three axes rectangular with each other, one of which is vertical. One of the carriages bears a welding or cutting head.

6 Claims, 3 Drawing Figures

PROCESS AND MACHINES FOR AUTOMATICALLY WELDING OR CUTTING THE JUNCTION POINT BETWEEN A MAIN PIPE AND A SECONDARY BRANCH PIPE

The present invention relates to a process and to machines for automatically welding or cutting the junction point between a main pipe and a secondary branch pipe.

The technical sector is that of the construction of automatic machines or robots for welding or cutting tubular structures comprising points of junction between pipes.

The problem to be solved is that of automatically effecting welding between a main pipe or a cylindrical ferrule and a secondary pipe which is to be welded thereon as a branch pipe, by means of a machine capable of adapting to different geometrical parameters (diameters and thickness of the pipes, angular spacing and distance between the axes of the two pipes, position of the junction point, length of the pipes) and to different welding parameters (speed of welding, form of the bevel).

Automatic welding machines capable of butt-welding two pipes or two ferrules or portions of cylindrical ferrules, are already known.

Complex problems are raised by the automatic welding of the points of junction between a main pipe and a secondary branch pipe, as the intersection of the two pipes is a three-dimensional curve and, in general, this type of welding can at the present time only be effected manually. Moreover, to obtain a good quality automatic welding, it is preferable to weld flat by means of an electrode maintained vertically above the welding bevel and substantially in the bisecting plane of the welding bevel.

To attain this result, it is necessary not only automatically to displace the welding head or heads, whilst maintaining them vertical, along three trirectangular axes in order to cause it or them to follow the curve of intersection of the two pipes whose coordinates may be calculated, but the piece to be welded must also be constantly positioned so as to be oriented so that the bisecting plane of the welding bevel corresponding to the spot located beneath an electrode is substantially vertical and that the electrode is therefore placed substantially in this bisecting plane.

If this condition is fulfilled, the weld is distributed substantially symmetrically on either side of the bisecting plane, and a homogeneous, symmetrical welding bead is obtained. Moreover, numerous processes of automatic electric welding require the use of a protective flux which may be a flux composed of solid particles. This flux forms a heap which must be distributed to cover the welding bead in the course of solidification. To attain this result and to be able to use a flux in powder form, the electrodes must be substantially in the bisecting plane of the bevel at the moment of welding.

The objects of the invention are attained by means of a process for automatically welding or cutting the junction point between a main pipe and a secondary branch pipe, said process comprising the following steps of:

placing the main pipe bearing the branch on a support which allows the assembly to pivot about a first axis merged with the axis of the main pipe and about a second horizontal axis perpendicular to the first axis by means of two servomotors each equipped with a control loop;

bringing above said support a travelling gantry crane bearing one or more welding or cutting heads mounted on three carriages which make it possible to displace the welding or cutting heads respectively along three axes rectangular with each other, one of which is vertical, by means of three servomotors each equipped with a control loop;

entering the data which define the two pipes and the weld into a computer which calculates, for each point of the curve of intersection of the two pipes, three variables corresponding to the coordinates measured along the three axes of displacement of said carriages and two variables which correspond to the orientation of said pipes about the two pivot axes and which transmits reference values to said servomotors which automatically displace said carriages whilst maintaining said heads vertical and which automatically position said tubes.

An automatic machine according to the invention comprises:

a pipe positioning support which bears the piece to be welded or cut, so that the latter can pivot about a first axis merged with the axis of the main pipe and about a second horizontal axis, perpendicular to the first axis, and which comprises two servomotors each equipped with a control loop for automatically rotating the piece to be welded about said axes;

a travelling gantry crane which comprises means for locking in fixed position above said support and which bears one or more vertical, automatic welding or cutting heads mounted on three carriages which may move respectively along three axes rectangular with each other, one of which is vertical and each of the carriages is driven in translation by a servomotor associated with a control loop;

a computer into which are introduced, before beginning a weld, the data which define the geometrical parameters of the junction and the weld, which computer calculates for each point of the junction three coordinates corresponding to the coordinates of said point with respect to the three axes of displacement of said carriages and two angles corresponding to the orientation of the piece to be welded about the two axes and which computer transmits said variables as reference values respectively to said five control loops.

The invention results in the possibility of automatically welding or cutting the junction between a main pipe and a secondary branch pipe placed thereon, whilst adapting to the geometrical dimensions of the pipes and to the parameters of the weld.

The welding machines according to the invention present the advantage that the welding heads work constantly in vertical position and in the plane of symmetry of the welding bevel, which makes it possible to use a flux in powder form and ensures welds of very good quality.

The welding machines according to the invention may be used for all mechanical productions comprising welding of junctions between cylindrical pieces, for example for connecting branch pipes on a main pipe or for making nodes of tubular structures such as off-shore platforms.

Since the welding or cutting heads are mounted on a travelling gantry crane, which may be moved away from the positioning support, it is possible to handle very heavy and cumbersome pieces with hoisting machines to place them on the positioning support or for removing them therefrom.

The invention will be more readily understood on reading the following description with reference to the accompanying drawings, in which.

Figure 1:
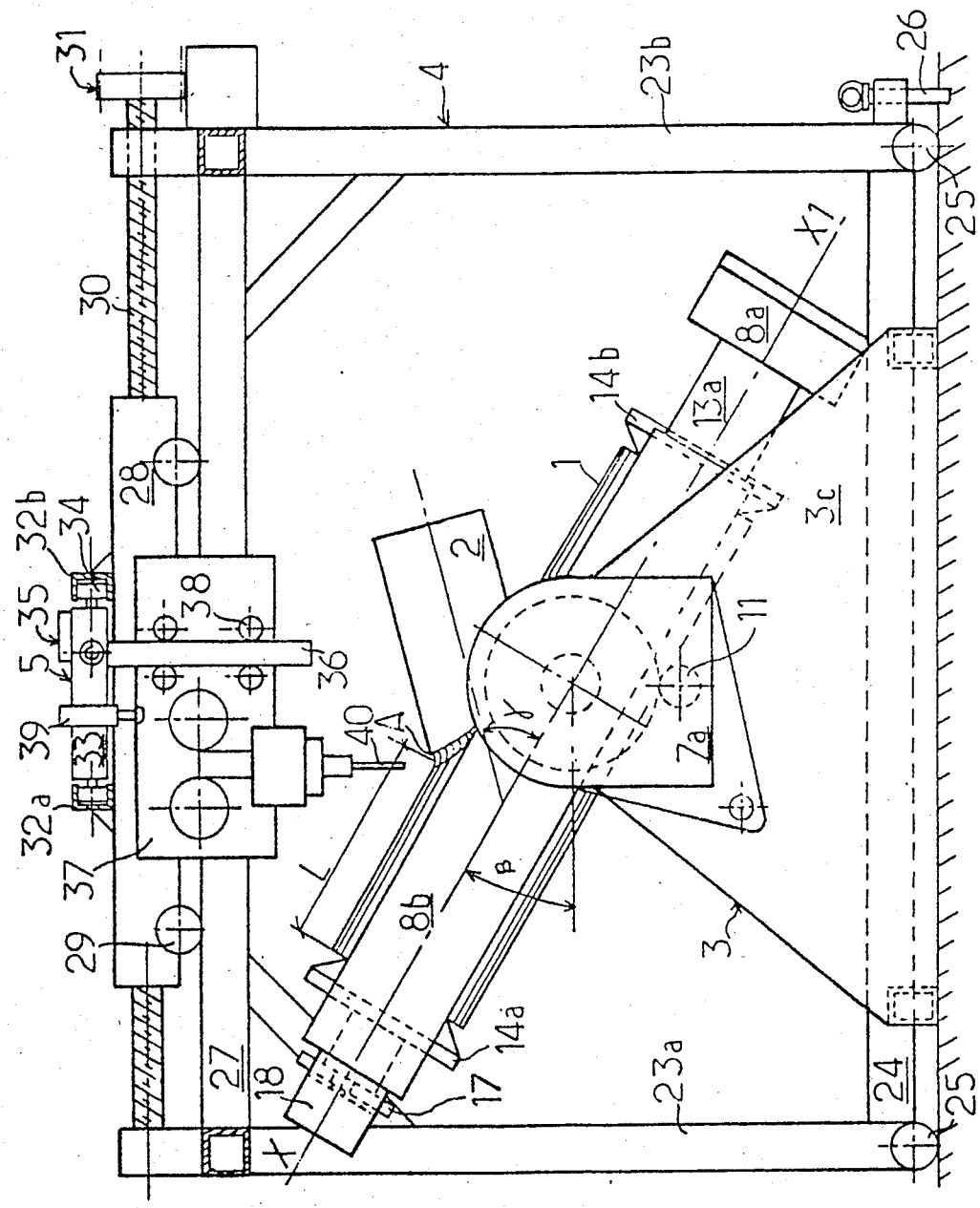
FIG. 1 is a view in elevation of a machine according to the invention with a partial section of the travelling gantry crane.
Figure 2:
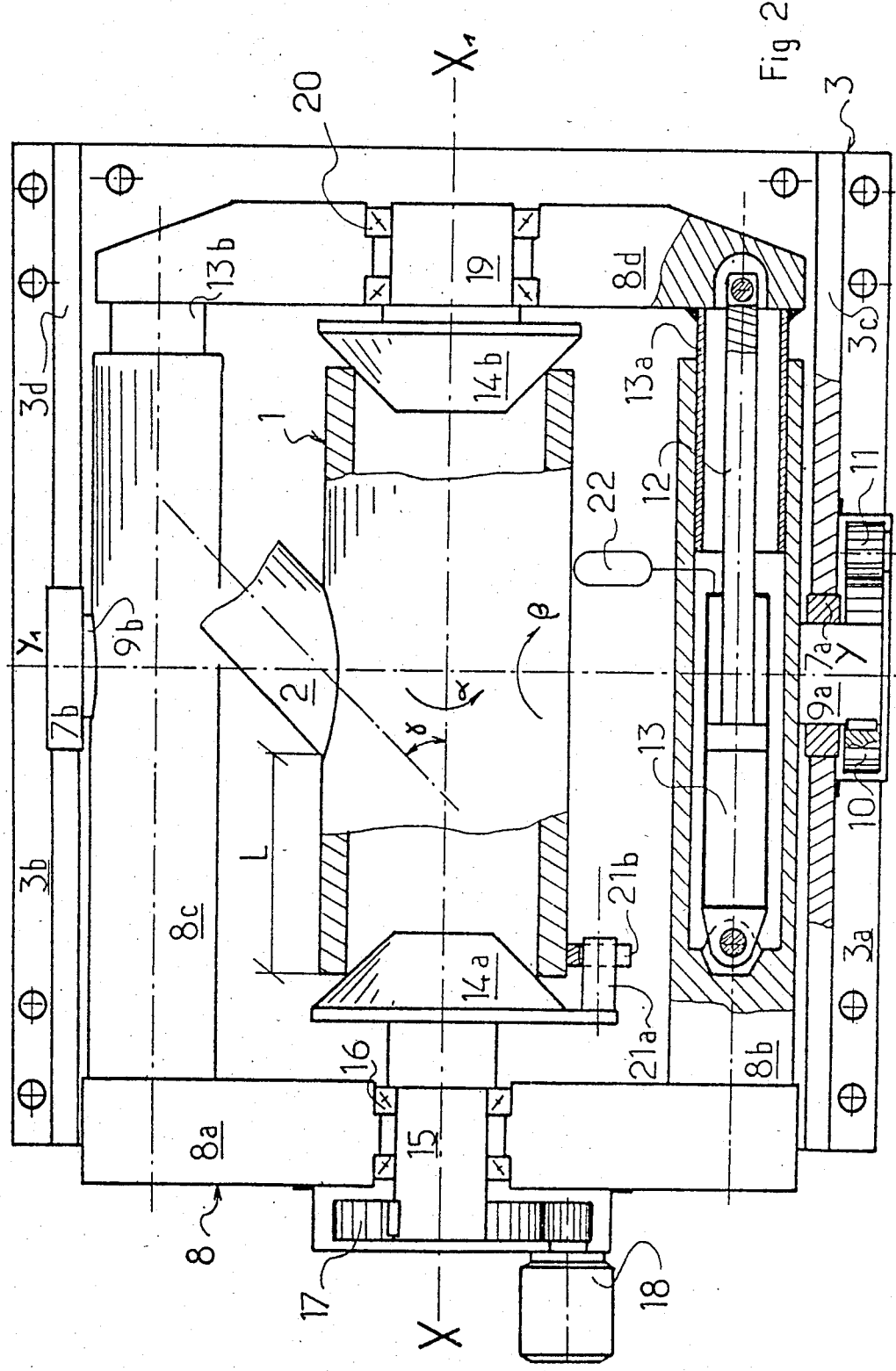
FIG. 2 is a plan view of the frame of the machine.

Referring now to the drawings, FIGS. 1 and 2 show a welding machine for automatically welding a point of junction between a straight pipe or main pipe or a cylindrical ferrule 1 of diameter DI and a secondary pipe 2 of diameter D2 which must be welded as a branch pipe on pipe 1. The axes of the two pipes 1 and 2 may or may not be located in the same plane.

The machine according to the invention is capable of adapting to pipes whose diameters D1 and D2 may take different values as well as to junctions whose angle $\gamma$ between the axes of the two pipes may vary as well as the shift L between the end of the main pipe and the branch.

It may also be adapted to different speeds of welding and to different angles of opening of the welding bevel which vary depending on the thickness of the pipes and depending on the angular spacing $\gamma$.

FIGS. 1 and 2 show a junction comprising one branch only, but it is specified that a machine according to the invention may also weld junction nodes comprising a plurality of branches or a plurality of cross-bracings. In this case, the machine successively welds each junction.

A machine according to the invention may be used automatically to weld junction nodes of tubular structures, for example the structures used for constructing off-shore platforms and, in this case, the branches may be welded on a main pipe which is continuous and comprises no cut-out providing communication between the two pipes.

A machine according to the invention may also serve to weld a branch which communicates with a main pipe or with a reactor ferrule or other cylindrical apparatus, and, in this case, the main pipe or the ferrule is cut.

The machines according to the invention are intended automatically to effect welds on assemblies which may be very heavy and weigh several hundreds of kilonewtons.

The essential members of a machine according to the invention are a positioning support 3 which is fixed to the ground and which bears the pieces to be welded, a travelling gantry crane 4 which comes into position above the positioning support and which bears a mobile welding or cutting assembly 5 movable along three trirectangular axes and a computer 6 which receives the data which geometrically characterize a junction and the weld, which automatically calculates the coordinates of each point of the intersection of the two pipes and which delivers five reference values which are transmitted to five control loops.

Before describing the elements of the machine in detail, the general outline of the problem to be solved will be set forth.

The tubes 1 and 2 are cylinders and since their geometrical parameters, i.e. their respective diameters D1 and D2, their thicknesses, the angle $\gamma$ of the axes and the longitudinal position L of the branch with respect to the main pipe and possibly the spacing between the two axes if they are not concurrent, are known, the curve of intersection of the two pipes is defined and it is therefore possible to programme a computer for it to calculate the coordinates of the different points of the curve from the geometrical parameters which are data introduced into the computer by means of a keyboard or any other data introducing means.

As a variant, the geometrical parameters may be measured by sensors which are connected to the computer by an interface circuit enabling the computer to capture the geometrical parameters directly.

Once the curve of intersection is defined and the speed of welding determined, the computer may periodically deliver digital data corresponding for example to the coordinates, measured along three perpendicular axes, of the successive points of the intersection.

If the welding head is movable along these three axes, it may theoretically be envisaged to leave the piece to be welded fixed and automatically to displace one or more welding heads for them automatically to follow the curve of intersection at the desired speed.

However, this process would not be one leading to welds of better quality as the welding electrode, which has a fixed direction, would be presented obliquely with respect to the surfaces to be welded and a welding flux in powder form could not be used.

In the case of very thick pipes, this process would even be impossible to carry out.

The object of the invention is to provide a welding machine in which welding is constantly effected flat, i.e. by means of electrodes which are placed vertically above the welding bevel and, moreover, by maintaining the electrodes substantially in the bisecting plane of the welding bevel so that the welding beads are regular and homogeneous.

This result is attained by displacing the welding head along three axes rectangular with each other and by simultaneously pivoting the junction in the course of welding about two perpendicular axes of which one is merged with the axis of the main pipe.

Referring back to the drawings, FIG. 2 shows a plan view in part section of the positioning frame which supports the pieces to be welded and which enables said pieces to be automatically oriented.

This frame comprises longitudinal elements 3a, 3b which are fixed to the ground, which are connected together by crosspieces, and which support two lateral cheeks or side elements 3c, 3d, generally triangular in form and located in two parallel planes.

Each cheek bears at its summit a bearing 7a, 7b, respectively. The two bearings define a horizontal transverse axis Y-Y1.

The positioning frame comprises a pivoting frame 8 which comprises an open framework in the form of a U composed of a crosspiece 8a, parallel to axis Y-Y1 and of two lateral arms 8b, 8c. Each lateral arm bears a journal 9a, 9b on the outside. These journals are supported by the bearings 7a, 7b in which they may pivot freely, so that the frame 8 may pivot about the transverse axis Y-Y1.

One of the journals, for example journal 9a, bears a device for driving in rotation, constituted for example by a drive pinion 10 which is driven in rotation for example by a motor reduction gear or servomotor 11 of the toothed wheel/endless screw type, equipped with a hydraulic motor.

The servomotor 11 is associated with a control loop which comprises an angular displacement sensor of any known type, for example an analog sensor of the synchro or potentiometer type, or a pulsed digital sensor. This sensor measures the angle of rotation $\beta$ of the frame 8 about the axis Y-Y1. The control loop comprises comparison means which compare the measured value of the angle $\beta$ with a reference value $\beta o$ and which control the servomotor in the direction which returns the difference $\beta - \beta o$ to zero.

In a variant, the two journals, 9a, 9b may each be driven by a servomotor associated with a control loop and the two loops receive the same reference value $\beta o$.

The pivoting frame 8 further comprises a mobile transverse beam 8d which is parallel to the crosspiece 8a.

On the beam 8d are fixed the rods 12 of two hydraulic jacks 13 which are housed inside the lateral arms 8b, 8c which are hollow. The mobile beam 8d bears two guide sleeves 13a, 13b which engage inside the hollow arms 8b and 8c and which support the beam.

FIG. 2 shows that the beam 8d closes the opening of the framework 8a, 8b, 8c.

The positioning frame further comprises two centering cones 14a, 14b which engage in the ends of the main pipe 1 as shown in FIG. 2. One of the cones 14a is supported by a shaft end 15 which is itself mounted on roller bearings 16 borne by the crosspiece 8a. These roller bearings may be replaced by bearings. The shaft end 15 bears a drive pinion 17 which cooperates with a drive servomotor 18.

The servomotor 18 is of the same type as servomotor 11 and it is also associated with a control loop comprising an angular displacement sensor which measures the angle $\alpha$ of pivoting of the cone 14a about the longitudinal axis X-X1 of the shaft 15. By construction, the longitudinal axis X-X1 is perpendicular to the transverse axis Y-Y1 and located substantially in the plane of longitudinal symmetry of the frame 8.

The control loop maintains the angle $\alpha$ equal to a reference value $\alpha o$.

The cone 14b is borne by a shaft end 19 which is supported by roller bearings 20 borne by the beam 8d so that the cone 14b and the shaft 19 may pivot freely. The shafts 15 and 19 and the cones 14a, 14b are aligned along axis X-X1.

FIG. 2 shows that the jacks 13 make it possible to displace the beam 8d parallel to the longitudinal axis X-X1 to disengage the piece to be welded or to maintain the cone 14b engaged in one end of the main pipe 1.

The chambers of the cylinders of jacks 13 located on the beam 8d side are connected to a hydropneumatic accumulator 22 which acts as spring and which exerts on the rods 12 a constant traction which maintains the pipe 1 tightened between the two cones 14a, 14b whilst allowing expansions.

The hydropneumatic reservoir may be replaced by equivalent elastic means.

In certain cases, the friction between the cones 14a, 14b and the ends of the pipe 1 may be sufficient for the movement of rotation due to the servomotor 18 to drive the pipe 1 and the cone 14b in rotation about axis X-X1.

In order to avoid any risk of slide, the cone 14a advantageously bears a drive finger 21a and a drive member 21b having the form of a lever or a fork is fixed to the periphery of the pipe 1. The finger 21a abuts on the member 21b and drives pipe 1 in rotation.

Before starting to weld a branch 2, the end of the pipe end 2 is bevelled according to a determined law then the branch 2 is placed on pipe 1 and is fixed thereon for example by spot welding.

The pipe 1 bearing the branch 2 is then placed between the conical jaws 14a and 14b.

The inner diameter of the pipe 1 determines exactly the position of the end of the pipe on the conical jaw 14a and the computer can calculate this position which may serve as origin for the longitudinal coordinates. The conical form of the jaws centres the pipe 1 on the axis X-X1.

Of course, several sets of centering cones may be used, depending on the diameters of the main pipes.

FIG. 1 shows in elevation the travelling gantry crane 4 which bears the mobile welding or cutting assembly 5.

The travelling gantry crane 4 comprises a rigid structure which straddles the positioning frame. This structure is composed of vertical uprights 23a, 23b whose bases are connected together by longitudinal beams 24 and whose summits are connected together by beams and crosspieces forming a rigid framework. The height of the gantry crane and the height of the axis Y-Y1 with respect to the ground are such that the pivoting frame 8 bearing an assembly to be welded may pivot freely about the axis Y-Y1 through an angle $\beta = \pm 90°$ about on either side of the position in which the pipe 1 is horizontal.

The gantry crane 4 is mounted on wheels or rollers 25 which roll over a longitudinal track constituted by rails or slides fixed to the ground, which makes it possible to displace the crane to disengage the positioning frame, in order to position the piece to be welded on the frame and to remove it after welding. Stops enable the relative position of the gantry crane 4 with respect to the frame to be set with precision.

A locking device 26, for example screw jacks or pins or any other equivalent means, enables the gantry crane to be blocked on the track in its work position.

The upper part of the gantry crane 4 bears a longitudinal track 27 constituted by beams, rails, slides, etc..., which are horizontal and parallel to the vertical plane passing through axis X-X1.

The mobile welding or cutting assembly 5 comprises a first carriage 28 equipped with rollers or wheels 29 which roll over the track 27.

The carriage 28 is equipped with a servomotor which enables it to be displaced longitudinally over the track 27.

For example, the carriage 28 is fast with a nut which is mounted on a micrometer screw 30 parallel to the rails 27 and this screw is driven in rotation by a motor reduction gear 21. An analog or digital sensor measures the linear displacements x of the carriage 28 and transmits the measurement to a control loop which compares it with a reference value xo and which automatically controls the servomotor to cancel the difference $x - xo$. The device incorporating micrometer screw and nut may be replaced by a jack with linear displacement or by any other equivalent servomotor.

The carriage 28 bears a transverse, horizontal track parallel to axis Y-Y1, which is constituted for example by two slides 32a, 32b.

The mobile assembly comprises a second carriage 33 equipped with rollers 34 which roll in slides 32a and 32b.

The carriage 33 is driven in translation parallel to axis Y-Y1 by a servomotor 35 which is identical or not to servomotor 31 and also comprising a control loop which receives a reference value yo and which maintains the positioning y of the carriage 33 measured along an axis Y-Y1 equal to the reference value.

The carriage 33 bears a vertical track constituted for example by one or more vertical rails 36. The mobile assembly comprises a third carriage 37 equipped with wheels or rollers 38 which roll along vertical rails 36. The carriage 37 is displaced vertically by a servomotor 39 borne by the carriage 33 which is of the same type or not as the servomotors 31 and 35 and which also comprises a control loop which maintains the height z of the or each welding or cutting head 40 equal to a reference value zo.

The carriage 37 bears one or more welding or cutting heads 40 of any known type.

The welding heads are fixed to the carriage 37 so that the electrodes are vertical and remain vertical during all the displacements.

Each welding or cutting head comprises the usual devices for driving the electrodes, a gaseous or powder flux, electrical supply, etc....

The object of the present invention is to orient the piece to be welded at the same time as displacing the or each welding or cutting head, so that the welding or cutting electrodes remain vertical and are in the bisecting plane of the welding bevel.

When the carriage 37 bears a plurality of welding heads which make several superposed welding beads simultaneously, the bisecting planes corresponding to the successive heads are not merged.

In that case, the welding heads may be connected to the carriage 37 by a support adapted to rotate about a vertical axis which makes it possible to optimalize the relative position of one head with respect to the other, as a function of their distance and the form of the bevel so that each electrode is substantially in the bisecting plane of the bevel located plumb with respect thereto.

FIGS. 1 and 2 show the essential mechanical members of an automatic welding machine according to the invention.

Figure 3:
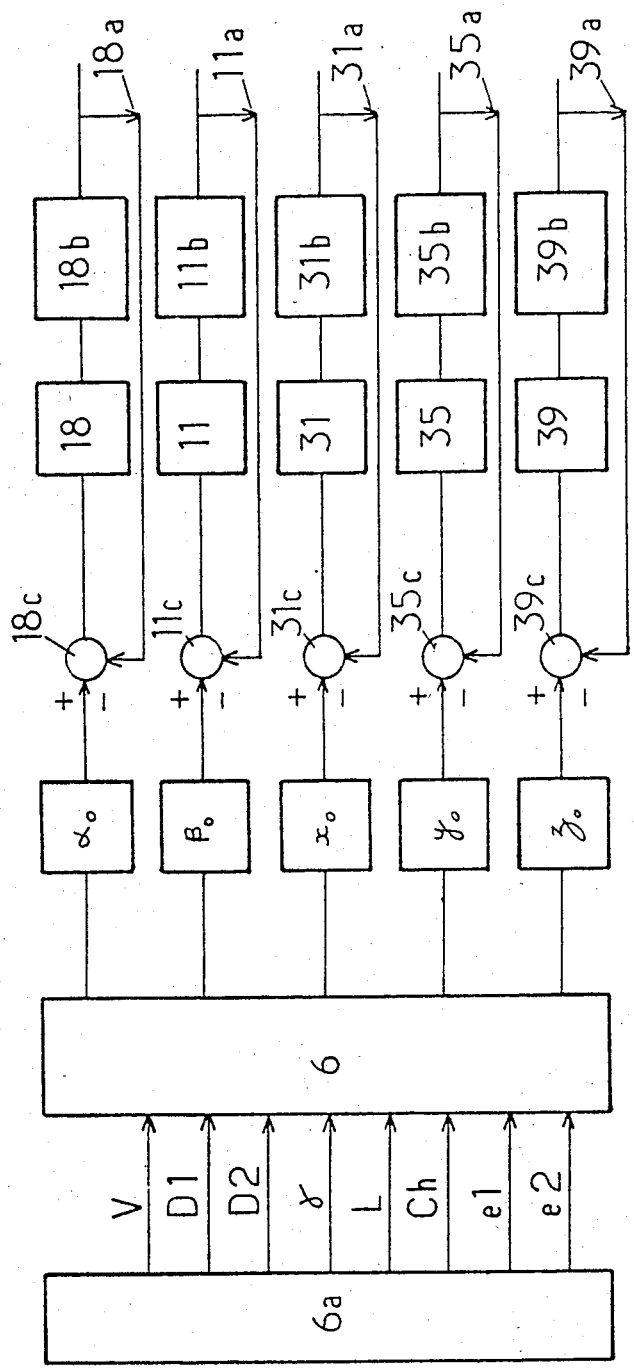
FIG. 3 is a diagram of the calculation and control members for automatically controlling the machine.

FIG. 3 is a diagram of the calculating and control members.

The machine comprises a computer 6 which is associated with data input means, for example with a desk 6a, which enables the parameters of the weld to be made to be introduced into the memory of the computer unit.

These parameters are the diameter D1 of the main pipe 1, the diameter D2 of the branch pipe 2, the angle $\gamma$ that the axis of the branch makes with the axis X-X1 of the main pipe, the distance L between the end of the main pipe and the point of the branch nearest said end, the thicknesses e1 and e2 of the two pipes and one or more parameters ch which characterize the law of variation of the bevel. The desired speed of welding V is also introduced into the memory. In the event of the axes of the two pipes not being concurrent, the distance between these axes is also introduced.

The computer is programmed to calculate, from these data, five variables which are transmitted as reference values to the five comparators of the five control loops which have just been described.

The programme is set up for the electrodes to move along the welding bevel at the desired welding speed and, at the same time, for the assembly to be welded to be oriented by pivoting about axes X-X1 and Y-Y1, so that the bisecting plane of the bevel located below each electrode is substantially vertical in order that the electrode lies substantially in this plane.

In the event of the welding head comprising two offset electrodes which weld simultaneously, it was seen previously that they may be mounted on a support adapted to rotate about a vertical axis which makes it possible to optimalize the relative position of the two electrodes with respect to each other.

FIG. 3 shows the five outputs of the computer 6 and the five reference values which are periodically emitted thereby.

The first output line gives the reference value of the angle $\alpha o$ of pivoting of the pivoting frame 8 about axis X-X1.

On the first line has been represented the servomotor 18 which drives the frame 8 and a control loop 18a comprising a sensor 18b which measures the angle of rotation $\alpha$ and which transmits the measured value to a comparator 18c which compares the latter with the reference value $\alpha o$ emitted by the computer.

The other lines of FIG. 3 respectively represent the reference values $\beta o$, xo, yo, zo emitted by the computer and the control loops 11a, 31a, 35a, 39a associated with each of them comprising the sensors 11b, 31b, 35b, 39b and the comparators 11c, 31c, 35c, 39c.

It will be recalled that $\beta$ is the angle of pivoting about axis Y-Y1 and x, y and z are the displacements of the mobile assembly along three trirectangular axes, axis y-y1 preferably being parallel to axis Y-Y1, axis x-x1 being a horizontal axis, preferably longitudinal, and z-z1 being necessarily vertical.

At the beginning of an automatic welding operation, the piece to be welded and the mobile assembly are placed manually in a determined position which is taken into account in the programme, for example in the position shown in FIG. 1 where the electrode 40 is placed above spot A of the weld, which lies at the intersection of the generatrices which are in the plane of longitudinal symmetry and which together make an obtuse angle.

The piece to be welded is positioned so that the bisecting plane of the welding bevel at spot A is substantially vertical.

From this initial position, the computer controls the operations and welding takes place automatically.

However, it is provided that each of the reference values can be adjusted manually by an operator, from a control desk, which makes it possible manually to control all the operations of approach of the welding head and of initial orientation of the piece to be welded.

The manoeuvres of the travelling gantry crane to disengage the frame are controlled from the desk.

An automatic welding machine has been described. It is specified that the welding heads may be replaced by cutting means, for example by an oxyacetylene torch and, in that case, the machine described can automatically cut a pipe.

To cut the end of a pipe 2 which must be mounted as a branch pipe, the cone 14a, which is driven in rotation, is equipped with a jaw which grips the other end of the pipe and which maintains it in overhang under the cutting head.

The advantage of this solution lies in the fact that the same geometrical parameters may be used for successively carrying out cutting then welding, this reducing the operations of adjustment of the sections to be welded and ensuring a junction of improved quality.

What is claimed is:

1. A process for automatically welding the junction line between a main pipe and a secondary branch pipe comprising the following steps:

placing the main pipe, bearing a secondary branch pipe, on a support which allows the assembly to pivot about a first axis merged with the axis of the main pipe and about a second horizontal axis perpendicular to the first axis, by means of two servomotors each equipped with a feed-back loop;

bringing above said support a travelling gantry crane bearing a welding assembly mounted on three carriages which make it possible to displace the welding torch, respectively, along three axes rectangular with each other by means of three servomotors each equipped with a feed-back loop;

entering the data which define the two pipes and the weld into a computer which calculates, for each point of the line of intersection of the two pipes, three variables corresponding to the coordinates measured along said axes of displacement of the three carriages and two variables which correspond to the orientation of said pipes about the two pivot axes so that the bisecting plane of the welding bevel at the upper point of the junction line is maintained vertical, and transmitting these five variables as reference values to said feed-back loops of said servomotors which automatically pivot said tube and displace said carriage so that said welding torch is displaced along said junction line and is maintained vertical and always contained in the bisecting plane of the welding bevel.

2. A machine for automatically welding or cutting the junction line between a main pipe and a branch pipe, comprising:

a pipe support which bears the branch pipe to be welded or cut so that the branch pipe can pivot about a first axis merged with the axis of said main pipe and about a second horizontal axis perpendicular to the first axis and which comprises two servomotors each equipped with a feed-back loop for automatically rotating the branch pipe to be welded or cut about said axis;

a travelling gantry crane which comprises means for locking it in fixed position above said pipe support and which bears a mobile welding or cutting assembly mounted on three carriages which may move, respectively, along three axes each perpendicular with the two others, of which one is vertical wherein each carriage is driven along one of said three axes by a servomotor associated with a feed-back loop; and a computer into which are introduced before beginning a work, the geometric data which define the pipes to be welded and the junction line between said pipes, which computer is programmed for calculating the three coordinates of each point of said junction line with respect to the three axes of displacement of said carriages and two angles corresponding to the orientation of the piece to be welded or cut about said two axes of rotation of said piece, and said computer is programmed for transmitting said three coordinates and said two angles as reference values, respectively, to each of said five feed-back loops;

wherein said pipe support comprises a fixed frame and a pivoting frame which is articulated on said fixed frame about a horizontal axis and which is driven in rotation about said axis by a servomotor associated with a feed-back loop, and said pivoting frame is a rectangular frame comprising a U-shaped piece composed of a crosspiece and of two lateral arms which bear in their middle opposite journals supported in bearings forming said horizontal axis, and a jack is housed in each of said lateral arms which are hollow, and said rectangular frame further comprises a mobile transverse beam which constitutes a fourth side of said rectangular frame and which is maintained by said jacks.

3. The machine of claim 2, wherein said travelling gantry crane is mounted on rollers which move over a track which extends beyond said positioning support, with the result that it is possible to disengage said positioning support entirely in order to position the pieces to be welded and to remove them.

4. The machine of claim 2, wherein said pivoting frame further comprises two coaxial centering cones which are mounted, respectively, in the middle of said mobile transverse beam and in the middle of said crosspiece to rotate about their axis, and one of said centering cones is driven in rotation by a servomotor associated with a feed-back loop, and said centering cones are engaged in the opposite ends of said main pipe.

5. The machine of claim 4, wherein said cone which is driven in rotation bears on its periphery a drive finger which cooperates with a drive member fixed on the periphery of said main pipe.

6. The machine of claim 2, wherein each of said jacks is connected on a hydro-pneumatic accumulator so that it elastically returns said mobile beam.

* * * * *